United States Patent [19]
Mack et al.

[11] Patent Number: 5,882,153
[45] Date of Patent: Mar. 16, 1999

[54] POWER DRILL WITH COMPACT CHUCK ASSEMBLY

[75] Inventors: Hans-Dieter Mack; Günter Horst Röhm, both of Sontheim, Germany

[73] Assignee: Gunter Horst Rohm, Sontheim, Germany

[21] Appl. No.: 606,996

[22] Filed: Feb. 26, 1996

[30] Foreign Application Priority Data

Feb. 25, 1995 [DE] Germany ......................... 195 06 708.8
Jun. 23, 1995 [EP] European Pat. Off. ............... 95109792

[51] Int. Cl.[6] ..................................................... B23B 45/00
[52] U.S. Cl. ................................ 408/240; 279/62; 173/48
[58] Field of Search ............................ 408/240; 279/902, 279/19, 62, 61, 60, 125; 173/48

[56] References Cited

U.S. PATENT DOCUMENTS

| | | | |
|---|---|---|---|
| 896,051 | 8/1908 | Ashey | 279/62 |
| 1,038,755 | 9/1912 | Hubbell | 279/62 |
| 1,053,530 | 2/1913 | North | 279/62 |
| 4,775,159 | 10/1988 | Manschitz | 279/62 X |
| 4,836,563 | 6/1989 | Rohm . | |
| 4,958,840 | 9/1990 | Palm | 408/240 X |
| 5,036,925 | 8/1991 | Wache | 173/48 |
| 5,072,954 | 12/1991 | Mack | 279/61 X |
| 5,232,230 | 8/1993 | Lin | 279/902 X |
| 5,378,002 | 1/1995 | Rohm . | |
| 5,499,830 | 3/1996 | Schnizler | 279/902 X |
| 5,590,985 | 1/1997 | Mack | 408/240 X |
| 5,624,125 | 4/1997 | Rohm | 279/902 X |

FOREIGN PATENT DOCUMENTS 34 37 792  1/1986  Germany .

Primary Examiner—A. L. Pitts
Assistant Examiner—Henry W. H. Tsai
Attorney, Agent, or Firm—Herbert Dubno; Andrew Wilford

[57] ABSTRACT

A drill has a drill housing and a drive spindle centered on and rotatable about an axis, projecting axially outward from the housing, and having an outer end. A chuck element is fixed on the spindle outer end and an annular formation is axially fixed on the housing, centered on the axis, and extends axially to the chuck element. The formation defines with the chuck element an annular chamber. An adjustment ring element is axially fixed but rotatable about the axis on the chuck element. One of the elements is formed with a plurality of axially forwardly open guide passages open axially rearward into the chamber and the other of the elements is formed with a screwthread centered on the axis. The elements both are rotatable about the axis relative to the formation. Respective jaws can move in the passages between axially front and radially closely spaced positions and axially back and radially widely spaced positions and have teeth meshing with the screwthread so that rotation of the ring element in a forward direction on the chuck element displaces the jaws axially forward and radially inward and opposite rotation of the ring element in a reverse direction on the chuck element displaces the jaws axially backward and radially apart. The jaws project rearward from the one element into the chamber in the back positions.

31 Claims, 19 Drawing Sheets

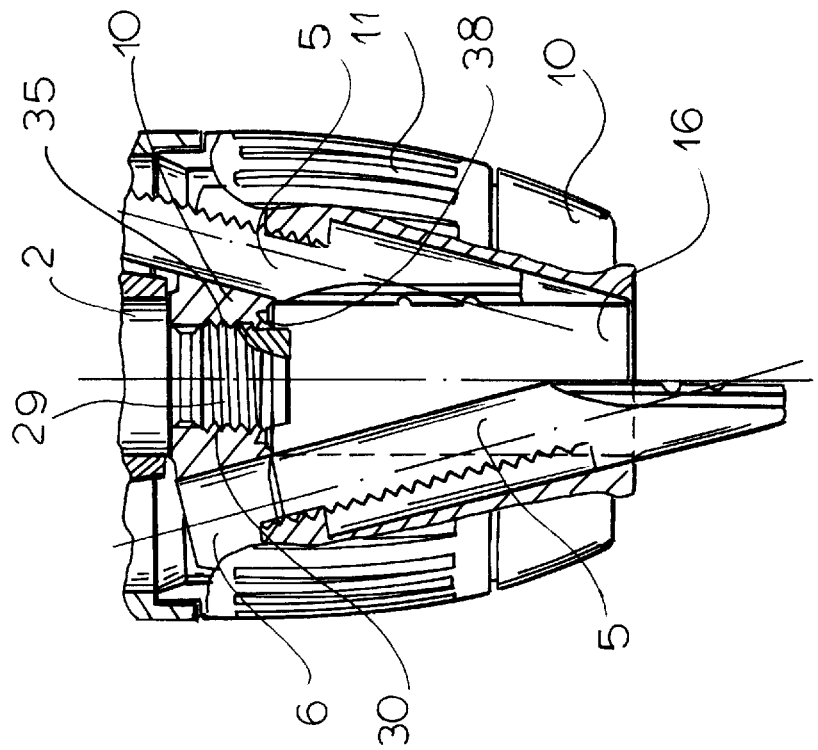
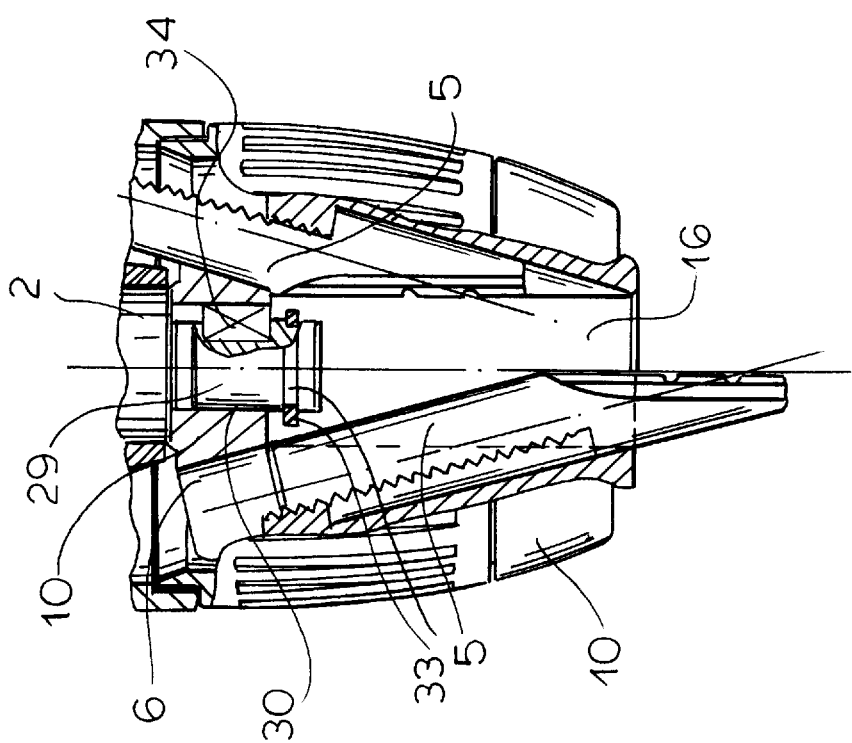

POWER DRILL WITH COMPACT CHUCK ASSEMBLY

FIELD OF THE INVENTION

The present invention relates to a drill chuck. More particularly this invention concerns a power drill and a chuck assembly for it.

BACKGROUND OF THE INVENTION

A standard drill has a drill housing and a drive spindle centered on and rotatable about an axis, projecting axially outward from the housing, and having an outer end. A chuck element is fixed on the spindle outer end and an adjustment ring element is axially fixed but rotatable about the axis on the chuck element. One of the elements is formed with a plurality of axially forwardly open guide passages open axially rearward into the chamber and the other of the elements is formed with a screwthread centered on the axis. The elements are both rotatable about the axis relative to the formation. Respective jaws are displaceable in the passages between axially front and radially closely spaced positions and axially back and radially widely spaced positions and have teeth meshing with the screwthread. Thus rotation of the ring element in a forward direction on the chuck element displaces the jaws axially forward and radially inward and opposite rotation of the ring element in a reverse direction on the chuck element displaces the jaws axially backward and radially apart.

The main problem with this type of drill and chuck assembly, which is described in my U.S. Pat. Nos. 4,836,563 and 5,378,002 and in my German patent 3,437,792 is that the overall length of the chuck assembly is excessive. In order to accommodate the axial travel of the jaws, it is necessary to make the chuck fairly long which makes the drill harder to handle while adding nothing to its functionality. Since the chuck itself is normally a standard item that is installed on the drill body, there is little interrelationship between the two parts, that is one is not designed to go particularly with the other.

OBJECTS OF THE INVENTION

It is therefore an object of the present invention to provide an improved power drill.

Another object is the provision of such an improved power drill which overcomes the above-given disadvantages, that is which has a more compact chuck assembly whose functioning is better integrated with that of the drill body.

SUMMARY OF THE INVENTION

A drill has according to the invention a drill housing and a drive spindle centered on and rotatable about an axis, projecting axially outward from the housing, and having an outer end. A chuck element is fixed on the spindle outer end and an annular formation is axially fixed on the housing, centered on the axis, and extends axially to the chuck element. The formation defines with the chuck element an annular chamber. An adjustment ring element is axially fixed but rotatable about the axis on the chuck element. One of the elements is formed with a plurality of axially forwardly open guide passages open axially rearward into the chamber and the other of the elements is formed with a screwthread centered on the axis. The elements both are rotatable about the axis relative to the formation. Respective jaws can move in the passages between axially front and radially closely spaced positions and axially back and radially widely spaced positions and have teeth meshing with the screwthread so that rotation of the ring element in a forward direction on the chuck element displaces the jaws axially forward and radially inward and opposite rotation of the ring element in a reverse direction on the chuck element displaces the jaws axially backward and radially apart. The jaws project rearward from the one element into the chamber in the back positions.

In this arrangement the chuck and drill body fit together and in fact the jaws are partially housed in the drillbody housing when fully back. As a result the entire assembly is quite compact and axially substantially shorter than the prior-art assemblies.

According to the invention the housing is provided with a bearing rotatably supporting the spindle and projecting from the housing. The chamber radially surrounds the bearing. Normally the chamber is radially outwardly closed by the formation and the formation extends axially past the chamber. Thus the jaws surround the spindle, rather than being axially ahead of it, reducing the length of the device. The shortness of the assembly makes the drill easier to use, and reduces the stress on the spindle bearings.

Furthermore according to the invention the formation has an axially outer end axially overlapping one of the elements. More specifically, the formation axially overlaps the adjustment element. The chuck body extends axially rearward past the chamber into the housing and is formed in the housing with a driven gear. The housing is provided with a drive gear meshing with the driven gear. The housing can be formed with a passage opening into the chamber and communicating with a blower in the housing connected to the passage for clearing chips from the chamber. Such integration of function is possible because of the compactness of the assembly. Similarly it is possible to provide means in the housing for axially hammering on the spindle.

The spindle and chuck element can be unitary with each other. Alternately the chuck element has a seat in which the spindle outer end is seated. These part can be angularly coupled by making the outer end and seat of complementary noncylindrical shapes. It is also possible for the outer end to be provided with a snap ring axially coupling the spindle to the chuck element. The outer end is formed with a groove open toward the chuck element and the chuck element is deformed such that material of the chuck element engages in the groove. In another system a key angularly fixes the chuck element on the spindle. The outer end and seat can be complimentarily threaded and the outer end can be formed with an axially forwardly open groove while the chuck is deformed such that material of the chuck element engages in the groove. In another system the chuck element is formed between the jaws with an axially forwardly open tool-receiving recess and the spindle outer end engages in to the recess. When the spindle is limitedly axially movable relative to the chuck element the spindle outer end and chuck element have interengaging formations that angularly couple them together.

In another system according to the invention a radially displaceable member is angularly fixed in the annular formation and displaceable between an inner position engaging and locking the chuck element angularly in the annular formation and an outer position out of engagement with the chuck element and permitting relative rotation between the chuck element and annular formation. A spring engages the radially displaceable member and urges same into the outer position.

The chuck element according to the invention can be formed with an annular array of teeth engageable by the member. In another system the guide passages have rear ends into which the member is engageable. The spring can be an angularly extending leaf spring having an end constituting the member. The leaf spring is provided with an actuating part engaged through the annular formation. Such a spring can have two such ends each constituting such a member and each provided with a respective such actuating part. The actuating part can be a ring displaceable on the annular formation and having a cam engaging the spring. Alternately it is angularly but not axially displaceable on the formation or axially but not angularly displaceable on the formation.

In another system according to the invention a locking ring is rotationally fixed on the housing and axially displaceable between one end position axially engaging and angularly arresting the chuck element and an opposite end position out of engagement with the chuck element. The locking ring and chuck element have axially interengageable teeth. More particularly the locking ring includes an outer ring part limitedly rotatable but axially fixed on the housing, an inner ring part axially displaceable but nonrotatable on the housing, and a cam between the ring parts for axially displacing the inner part on rotation of the outer part relative to the housing.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIGS. 6a through 6f are detail views of variants on the chuck;

SPECIFIC DESCRIPTION

Figure 1:
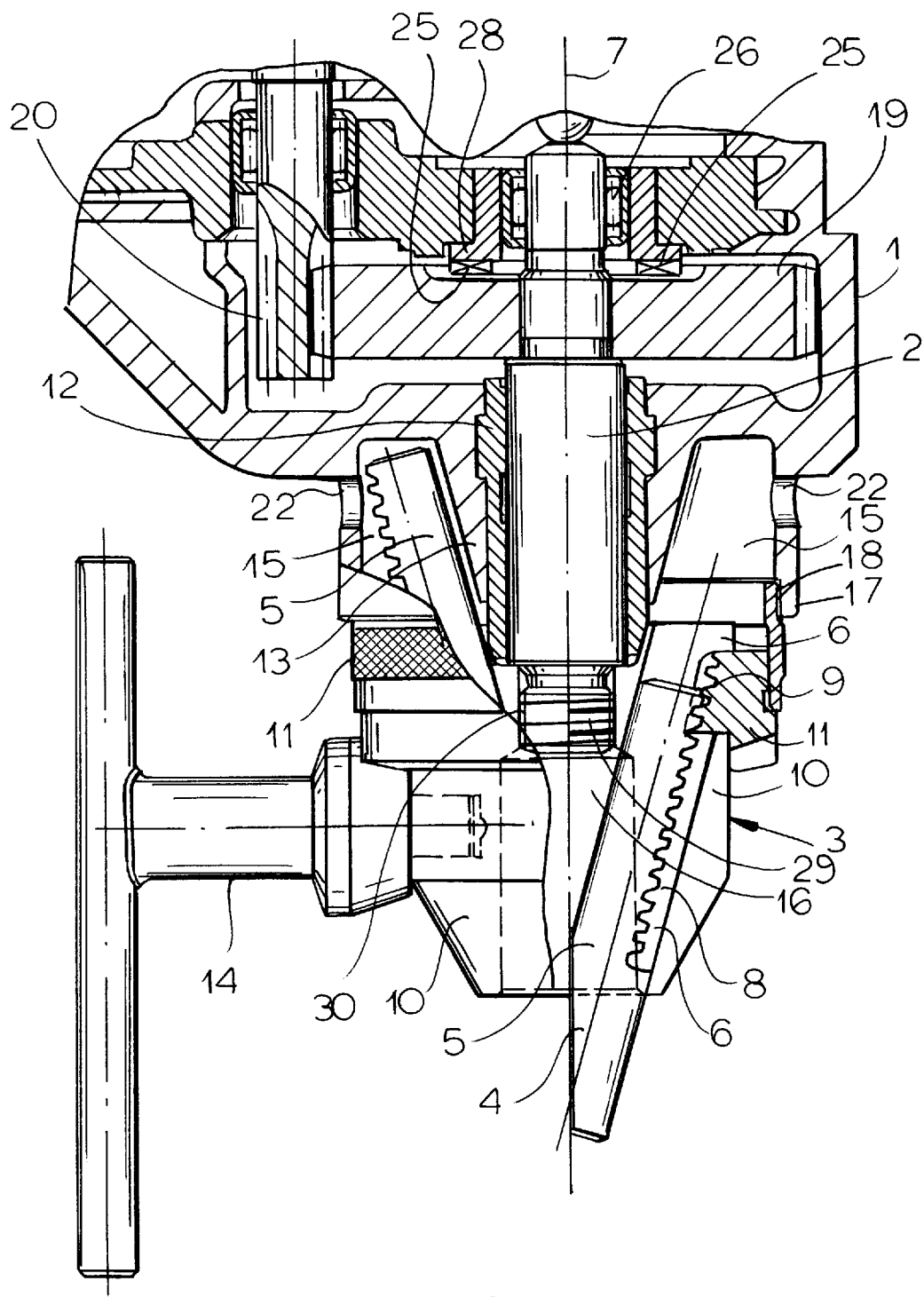
FIG. 1 is an axial section through a drill chuck according to the invention.

As seen in FIG. 1 a power drill according to the invention has a housing 1 from which projects a drill spindle 2 along an axis 7. A journal 12 supports the shaft 2 for rotation about the axis 7 and inside the housing 1 the spindle 2 is fixed on a large-diameter gear 19 meshing with a small-diameter drive pinion 20 driven directly by an unillustrated electric motor. The spindle 2 has a threaded outer end 29 seated in a threaded bore 30 of a chuck 3 having a body 10 formed with three angled guide passages 6 each holding a respective jaw 4. An adjustment or tightening ring 11 is rotatable but axially fixed on the body 10 and has an internal screwthread 9 meshing with rows of teeth 8 on the outer edges of the jaws 4. Thus rotation of the ring 11 on the chuck body 10 in one direction advances the jaws to a front position shown to the right in FIG. 1 and opposite rotation pulls them back to a back position shown to the left in FIG. 1. In the back position rear ends 5 of the jaws 4 project axially backward out of the guides 6 and a relatively thick tool can be held in a forwardly open tool recess 16 defined by the jaws 4. A key 14 can be fitted into a hole in the body 10 to mesh with teeth formed on the ring 11 to operate the chuck. Alternately as is well known in the art, the guides 6 could be formed in the ring 8 and the screwthread 9 on the body 10 for similar operation.

The housing 1 is formed centered on the axis 7 with an inner collar 13 holding the journal bearing 12 and with a cylindrical outer collar 17 defining an annular space or chamber 15 into which the jaw ends 5 engage in the back positions. Radially throughgoing holes 22 allow chips or the like to exit from the chamber 15, but otherwise the jaw ends 5 are contained and protected therein. A rearwardly extending projection of the ring 11 axially overlaps the front or outer end of the collar 17 at 18 for a relatively closed fit.

For hammer drilling a profile collar or washer 25 is provided surrounding the spindle 2. The rear end of the spindle 2 is held in a needle bearing 26 which is received in a bearing sleeve 27 in the housing 1. A flange 28 of the sleeve 27 lies between the impact collar 25 and the housing 1.

Figure 2:
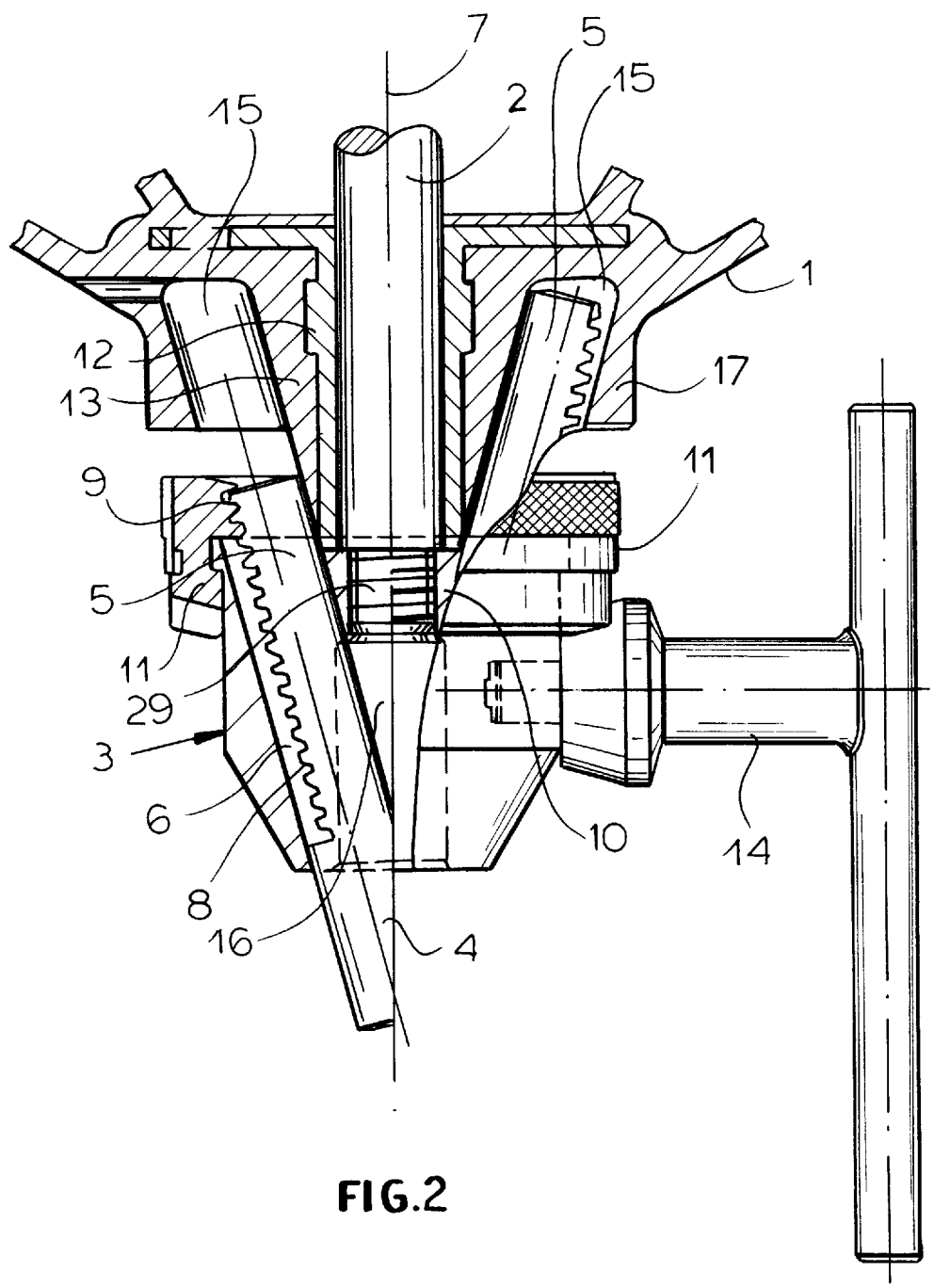
FIGS. 2, 3, 4, and 5 are views like FIG. 1 of other chucks in accordance with this invention.

FIG. 2 shows an arrangement with a gap between the front end of the collar or rim 17 forming the chamber 15 and the rear end of the chuck 3. Nonetheless here as shown to the right the rear ends 5 of the jaws 4 project into the chamber when in the back positions.

Figure 3:
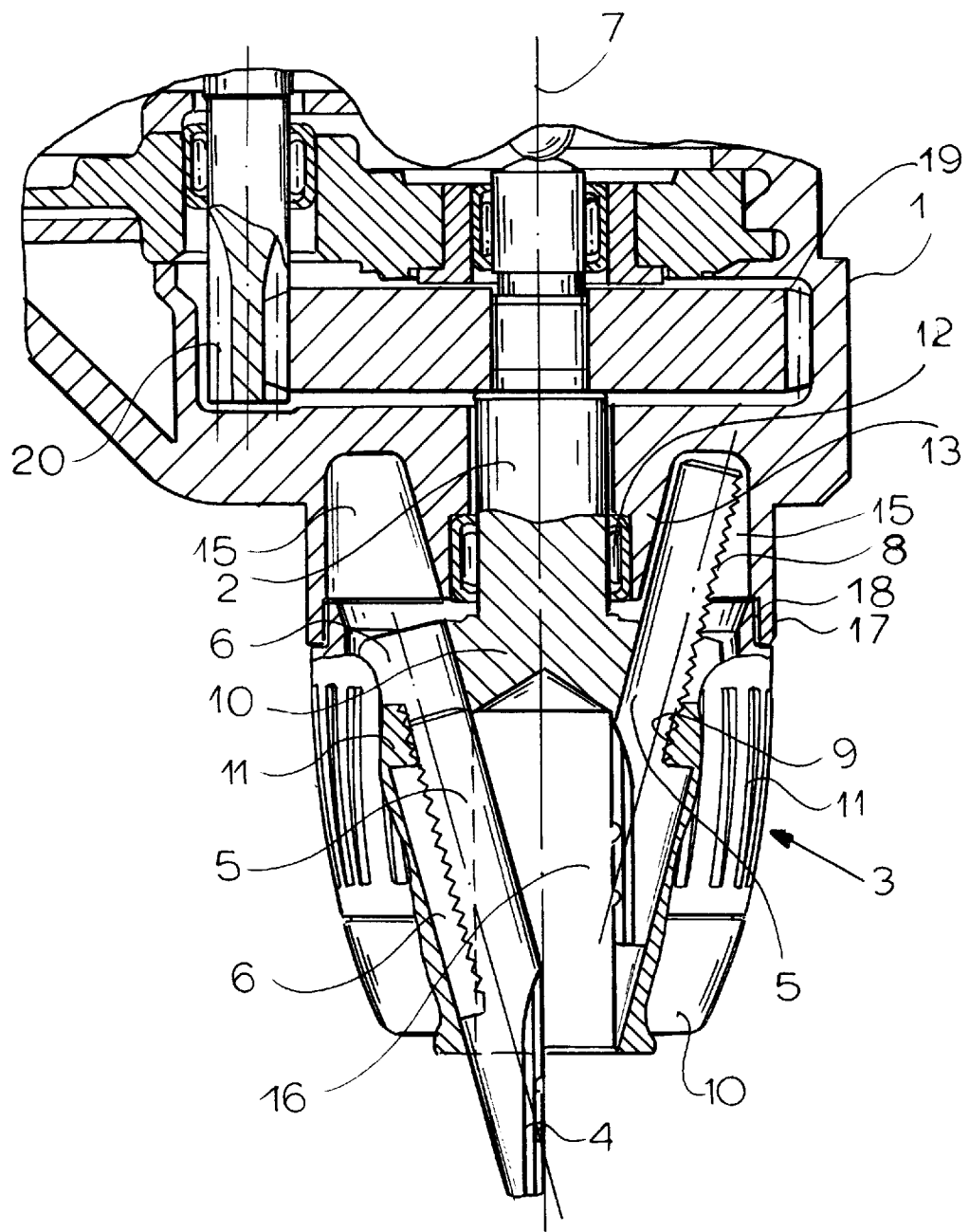

The chuck of FIG. 3 has a needle bearing 12 instead of a sleeve bearing. In addition this system does not use an adjustment key 14. Furthermore the spindle 2 is unitary with the chuck body 10.

Figure 4:
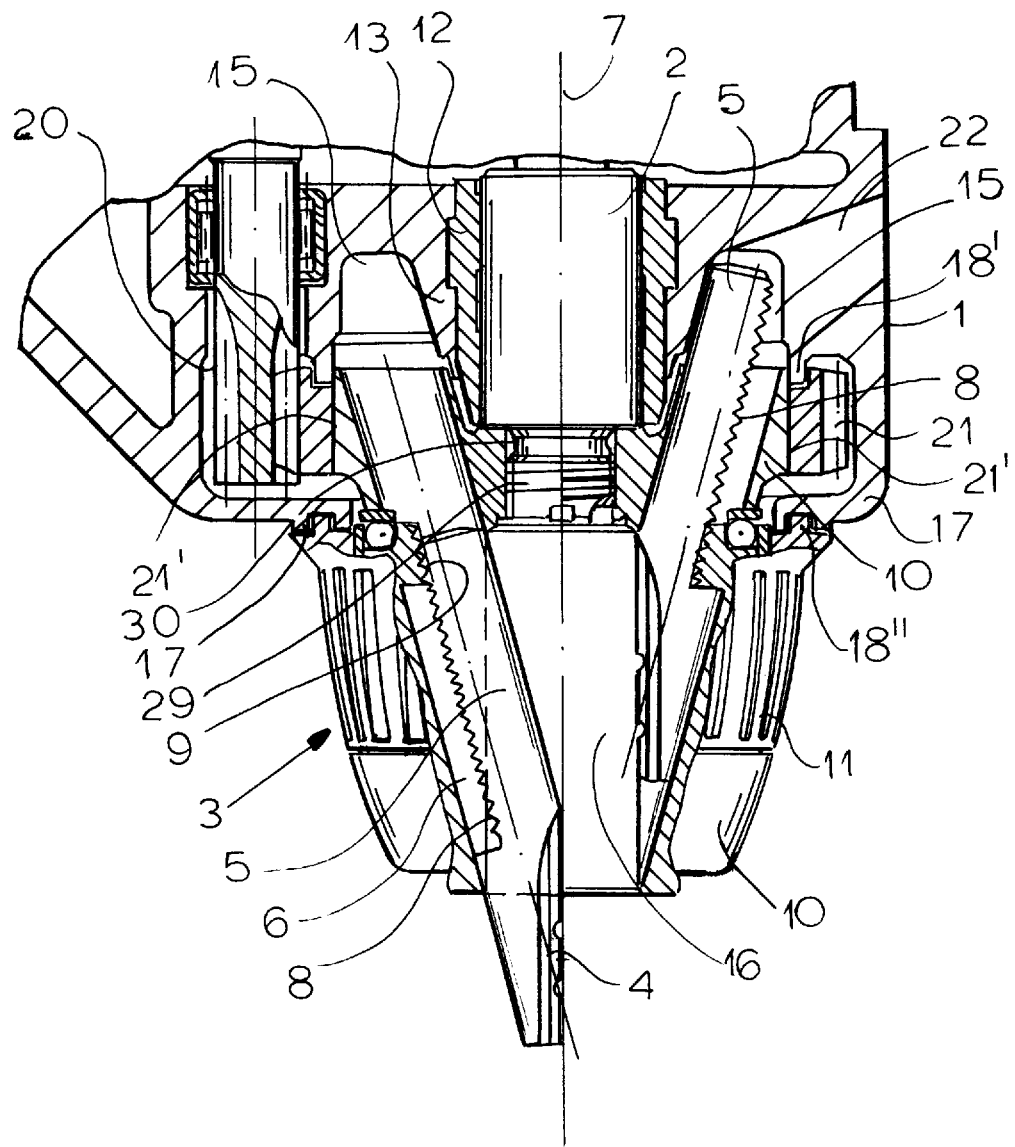

In FIG. 4 the chuck body 10 has a rear end 21' extending back into the housing 1 and fitted with a ring gear 21 directly meshing with the drive pinion 20. The housing 1 has an annular lip 18' received in a complementary groove in the rear of the gear 21' and the body 10 has a rearwardly projecting lip or rim 18" fitted to an annular groove in the housing 1.

Figure 5:
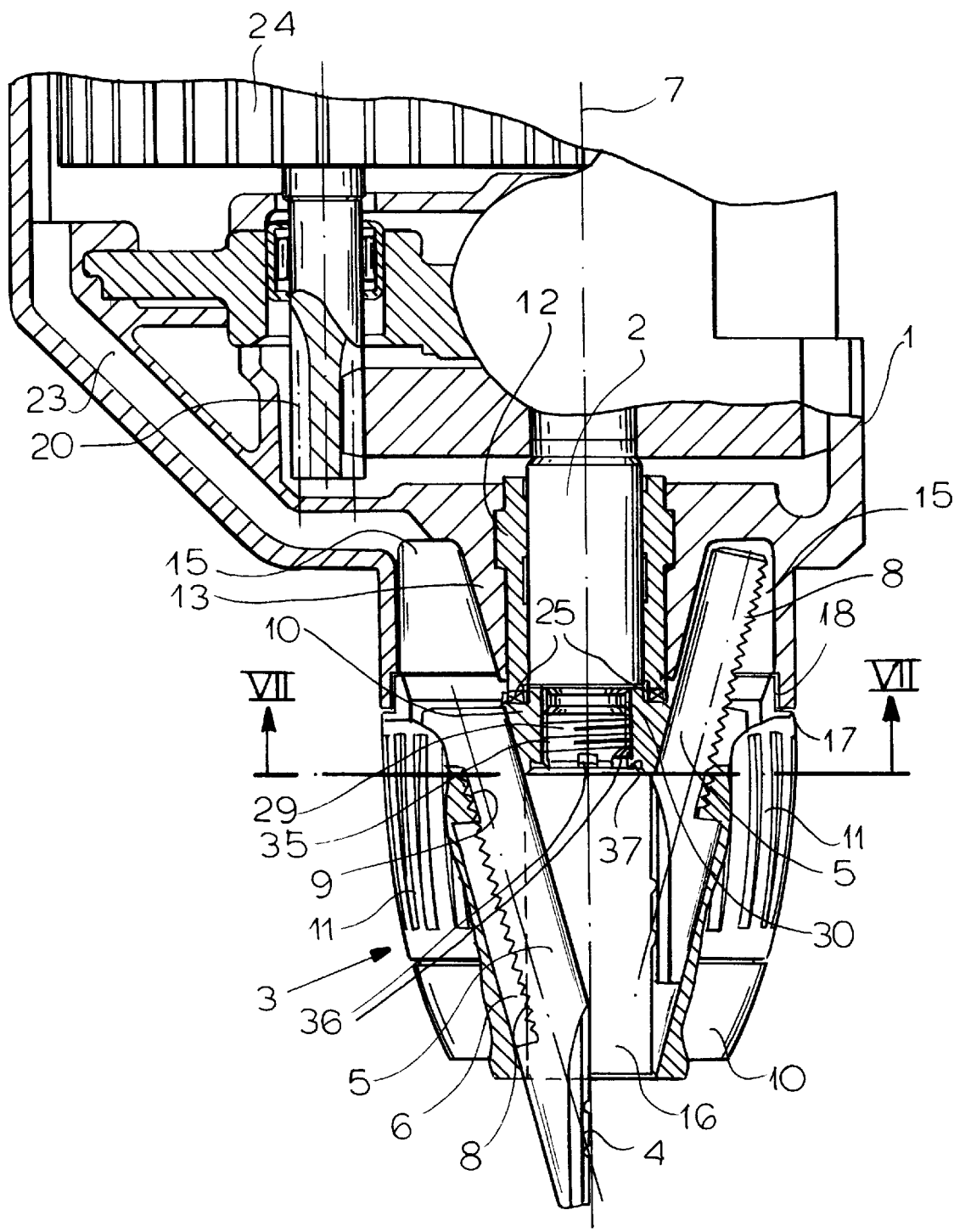
Figure 7:
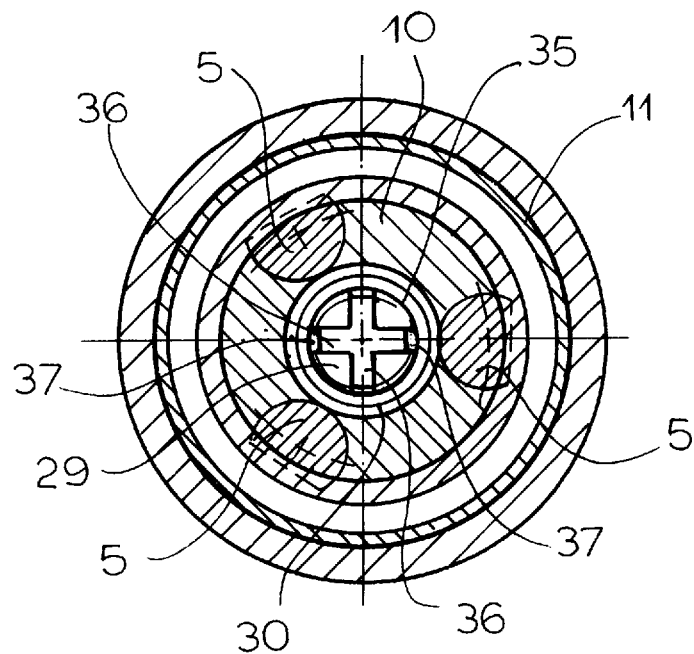
FIG. 7 is a cross section taken along line VII—VII of FIG. 5.
Figure 21:
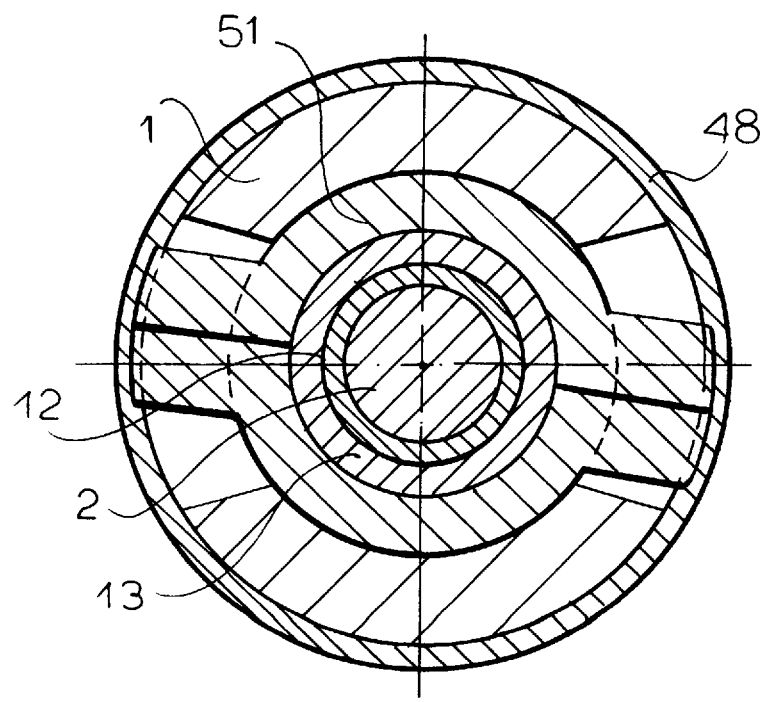
FIG. 21 is a section taken along line XXI—XXI of FIG. 18.

FIG. 5 shows a rim formation 17 that is not formed with vent holes 22; instead the housing 1 is formed with a vent passage 23 communicating with the chamber 15 and leading back to a fan 24 coaxial with the drive pinion 20. Depending on the direction of rotation, the fan impeller 24 can suck chips and the like back out of the chamber 25 or blow them forward therefrom. Here as also shown in FIG. 7 the front end 29 of the spindle 2 is formed with axially forwardly open and diametrally extending grooves 36 into which material 37 from the body 10 is engaged to angularly lock the body 10 on the spindle 2.

Figure 6B:
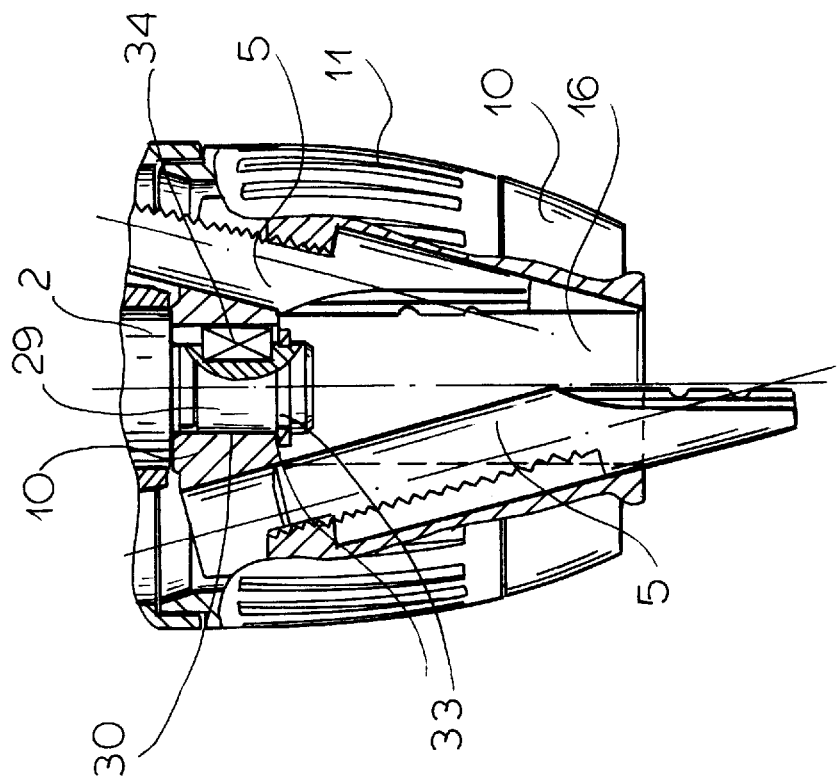
Figure 6A:
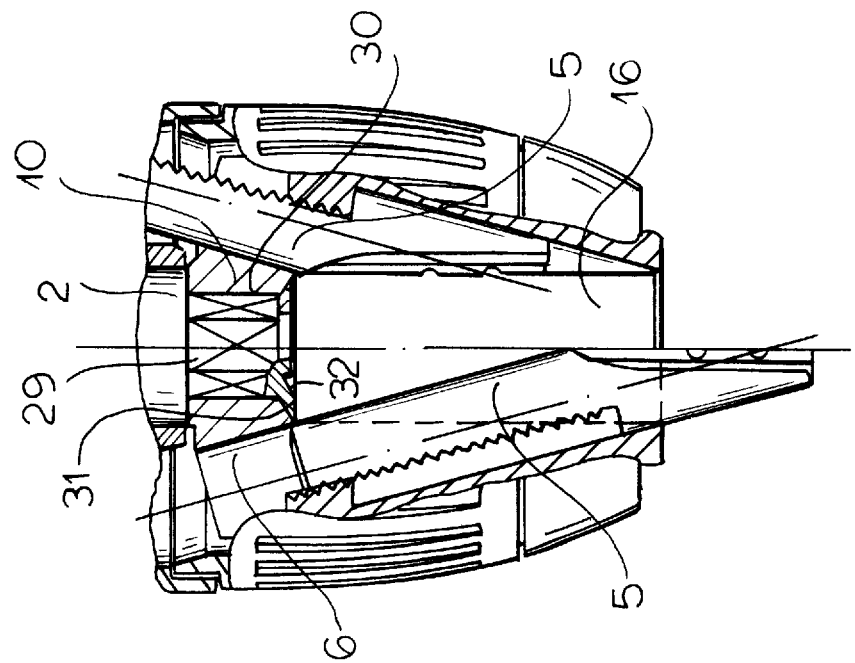
Figure 6E:
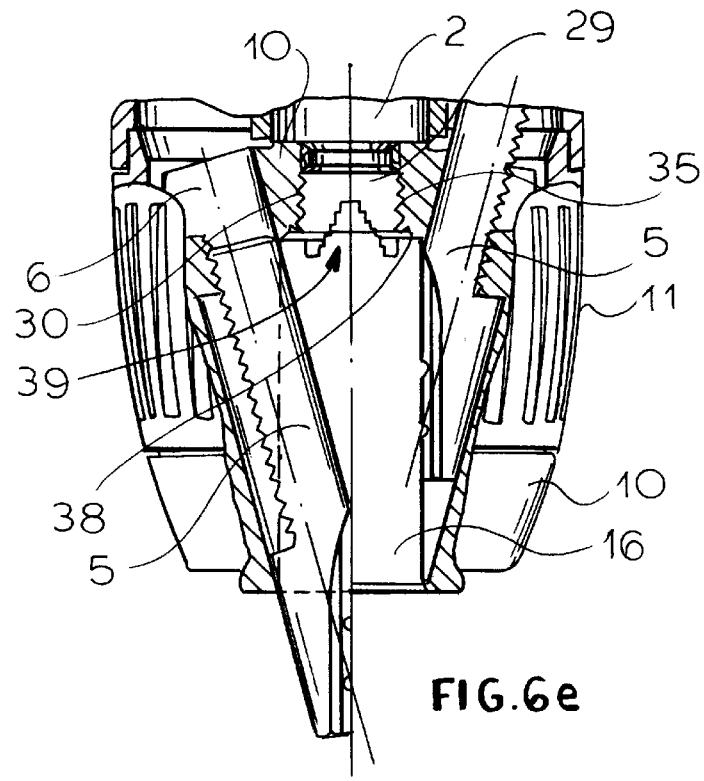
Figure 6F:
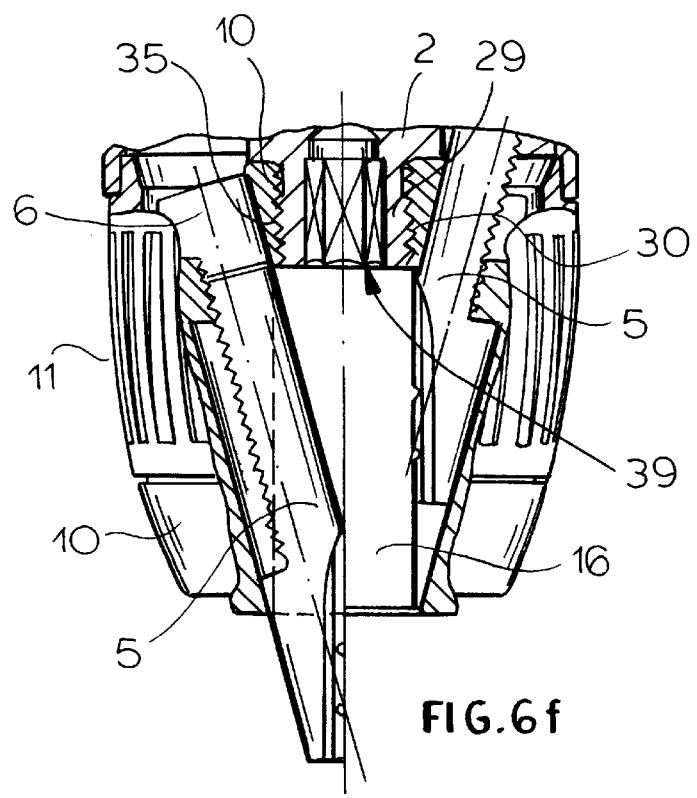

The front spindle end 29 is coupled to the chuck body 10 in FIG. 6a by providing an annular groove 31 in the seat 30 into which material 32 from the spindle 2 engages. FIGS. 6b and 6c show a snap ring 33 engaged on the end of the spindle 2 serving for such axial coupling while a key 34 effects angular coupling while still permitting some relative axial movement for hammer drilling. In FIG. 6d axial grooves 35 are partially filled with material 38 from the chuck body 11 to rotationally couple these parts. FIG. 6e shows a spindle 2 formed at its front end with a seat 39 for a tool and in FIG. 6f the seat 39 is shown to be hexagonal to actually complementarily receive a tool end and couple the unillustrated tool, e.g. a screwnail bit, directly to the spindle 2.

Figure 8:
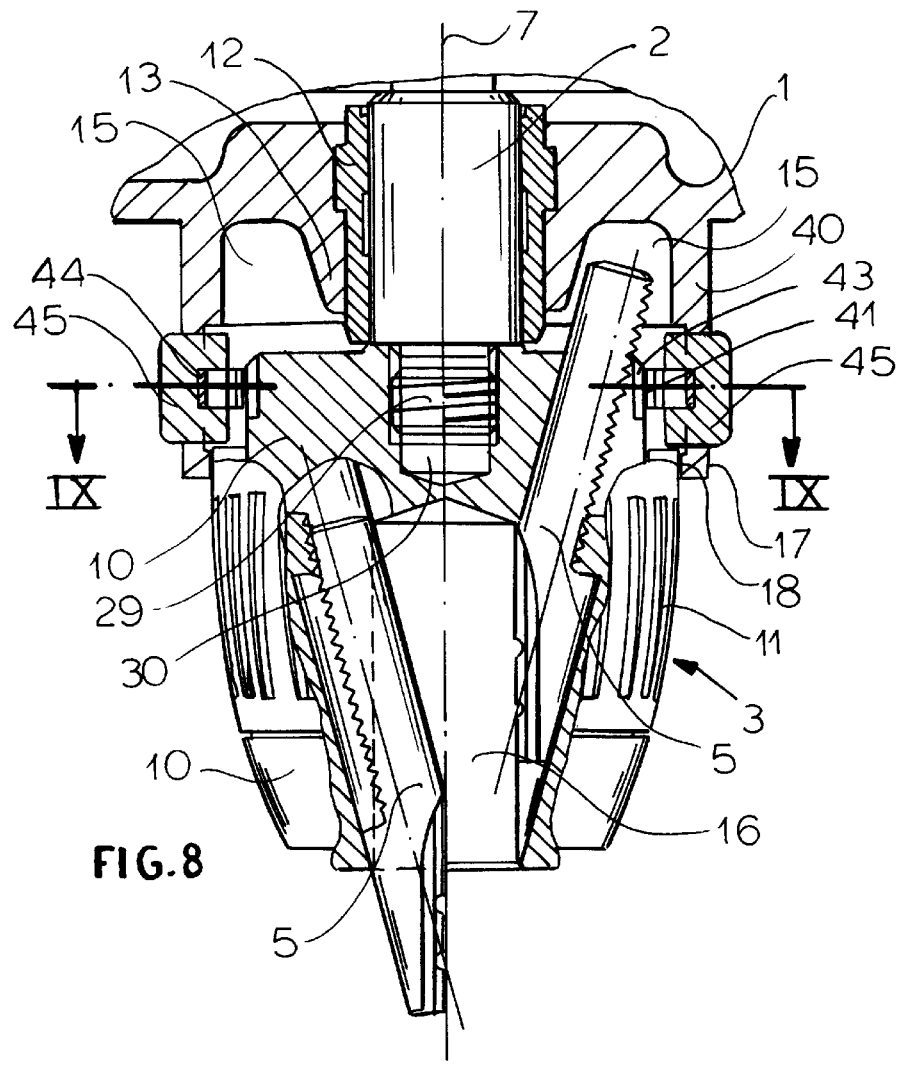
FIG. 8 is an axial section through yet another chuck.
Figure 9:
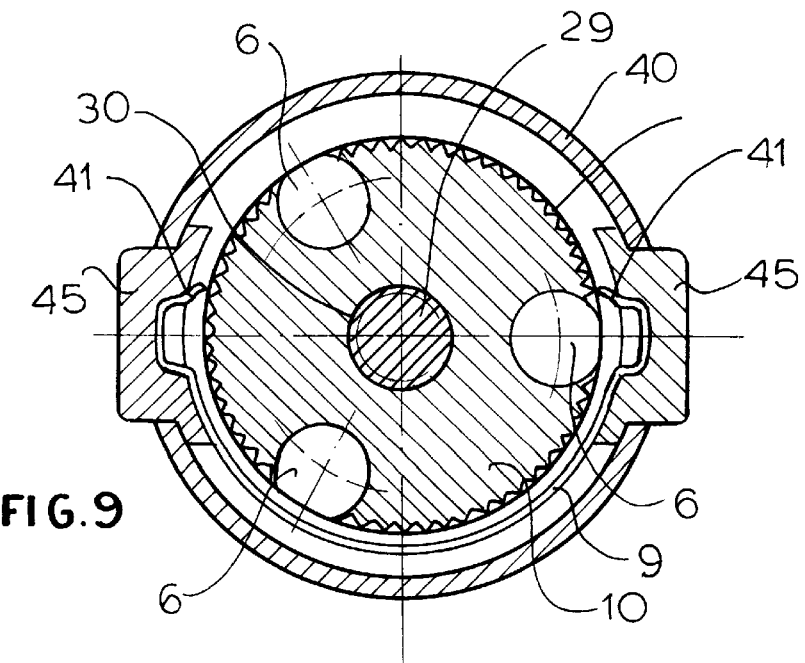
FIG. 9 is a cross section taken along line IX—IX of FIG. 8.

The chuck of FIGS. 8 and 9 has a collar 40 forming the chamber 15 and extending axially forward past and around the chuck body 10. Here a leaf spring 44 has engagement elements or ends 41 that can engage between teeth 42 formed on the body 10. The ends of this spring 44 are seated in diametrally opposite buttons 45 that project outward through windows in the collar 40. The user can therefore arrest the body 1 relative to the collar 40, which is fixed on the housing 1, simply by squeezing the buttons 45 so that the ends 41 engage between the teeth 42, thereby locking the two parts together for motor-assisted tightening or loosening. Since there are three angularly equispaced guides 6 and the two ends 41 are nearly diametrally opposite each other, even through these ends 41 are level with the rear ends of the guides 6 at any given time at least one of the ends 41 will be able to engage the teeth 42.

Figure 10:
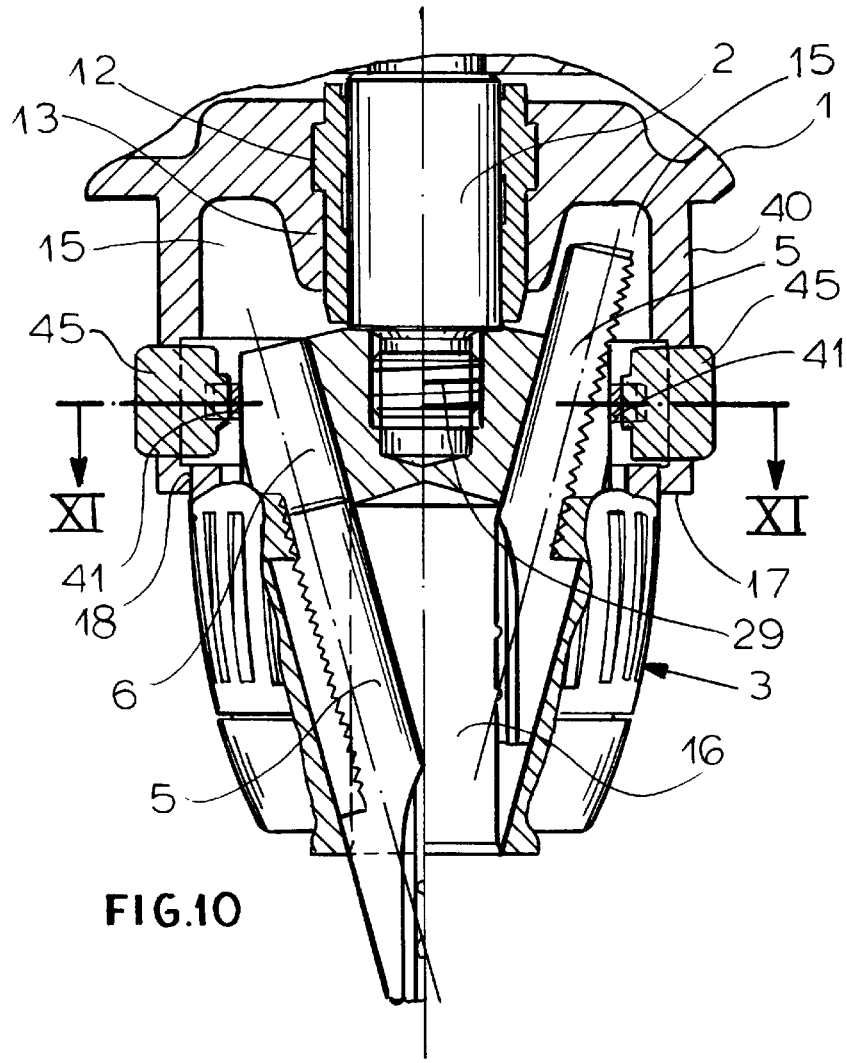
FIG. 10 is an axial section through yet another chuck.
Figure 11:
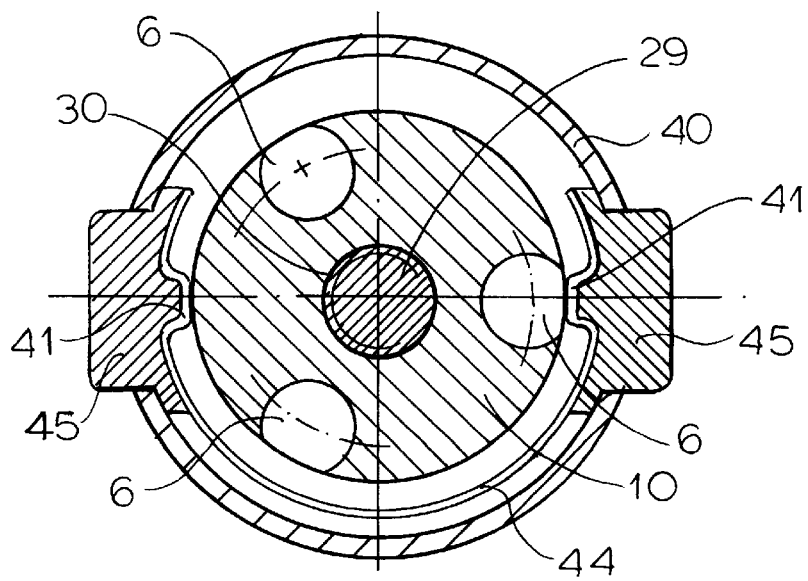
FIG. 11 is a cross section taken along line XI—XI of FIG. 10.

The system of FIGS. 10 and 11 is similar to that of FIGS. 8 and 9 except that the body 10 is not provided with teeth 42. Instead the engaging elements 41 of the spring 44 can engage in the open rear ends of the guides 6 to couple the collar 40 with the body 10.

Figure 12:
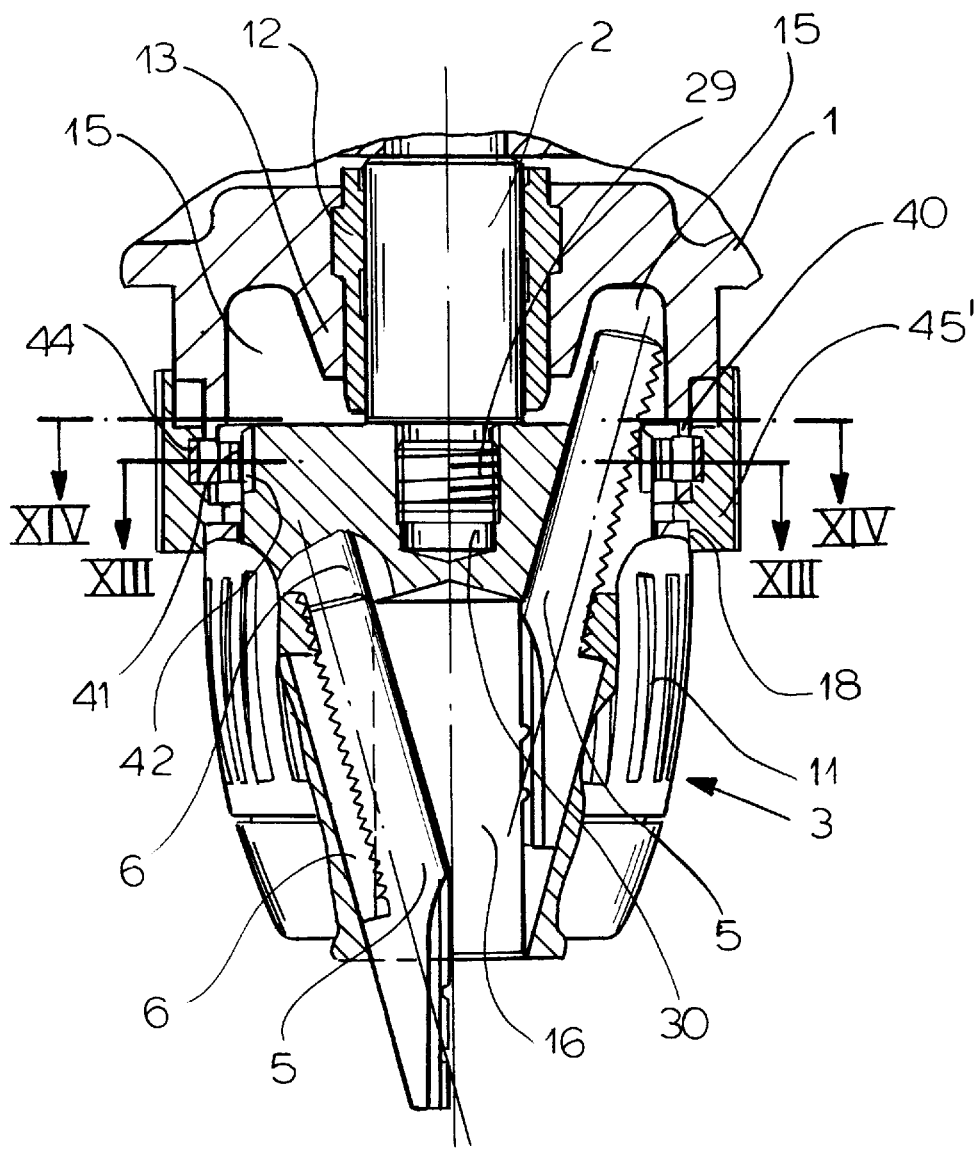
FIG. 12 is an axial section through yet another chuck.
Figure 13:
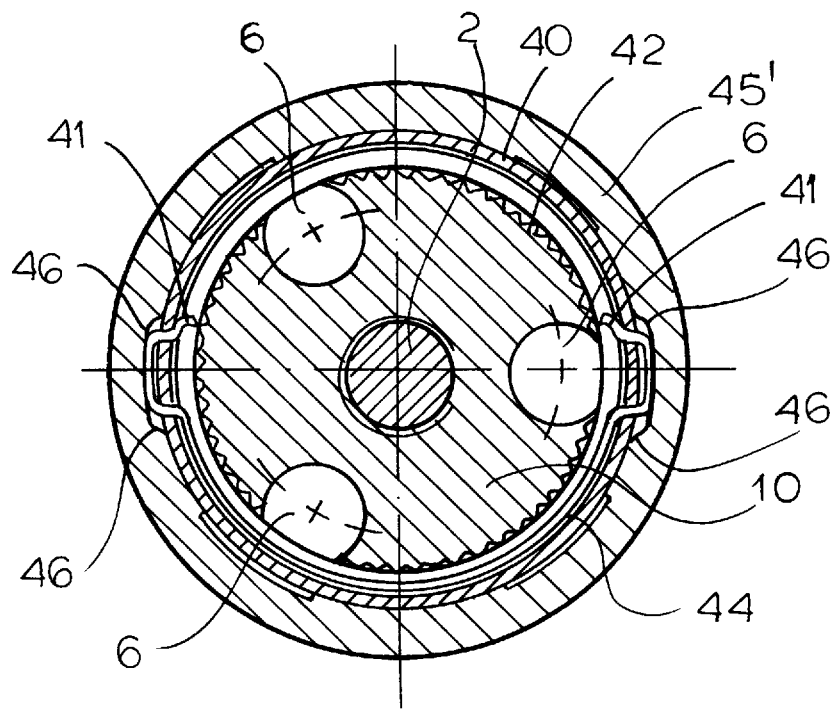
FIGS. 13, and 14 are cross sections taken along respective lines XIII—XIII and XIV—XIV of FIG. 12.
Figure 14:
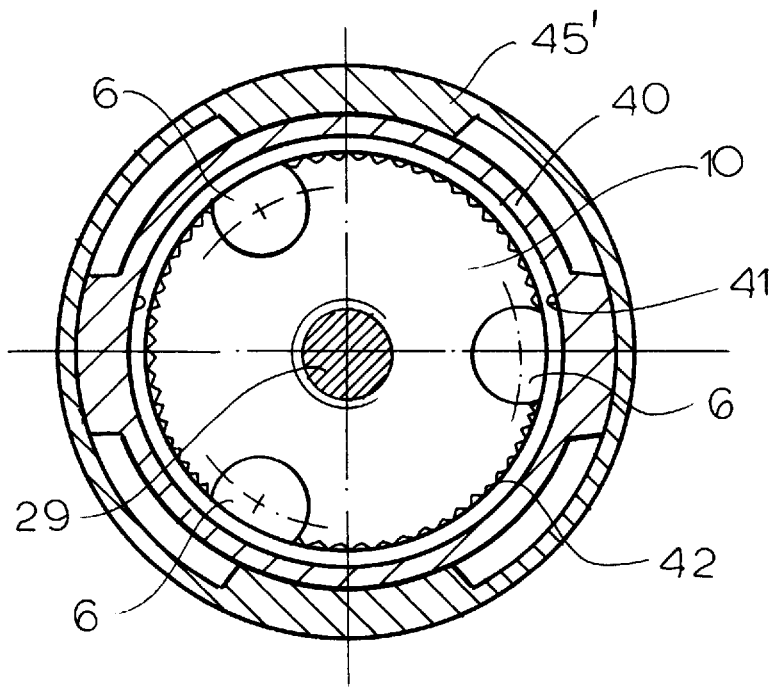

In FIGS. 12 through 14 the spring 44 is actuated by a rotary ring 45' having cam formations 46. When this ring 45' is moved to one end position, the cam formations 46 force the spring ends 41 in to engage with the teeth 42. In the opposite end position the natural elasticity of the spring 44 holds them out. The ring 45' is rotatable but axially nondisplaceable on the collar 40.

Figure 15:
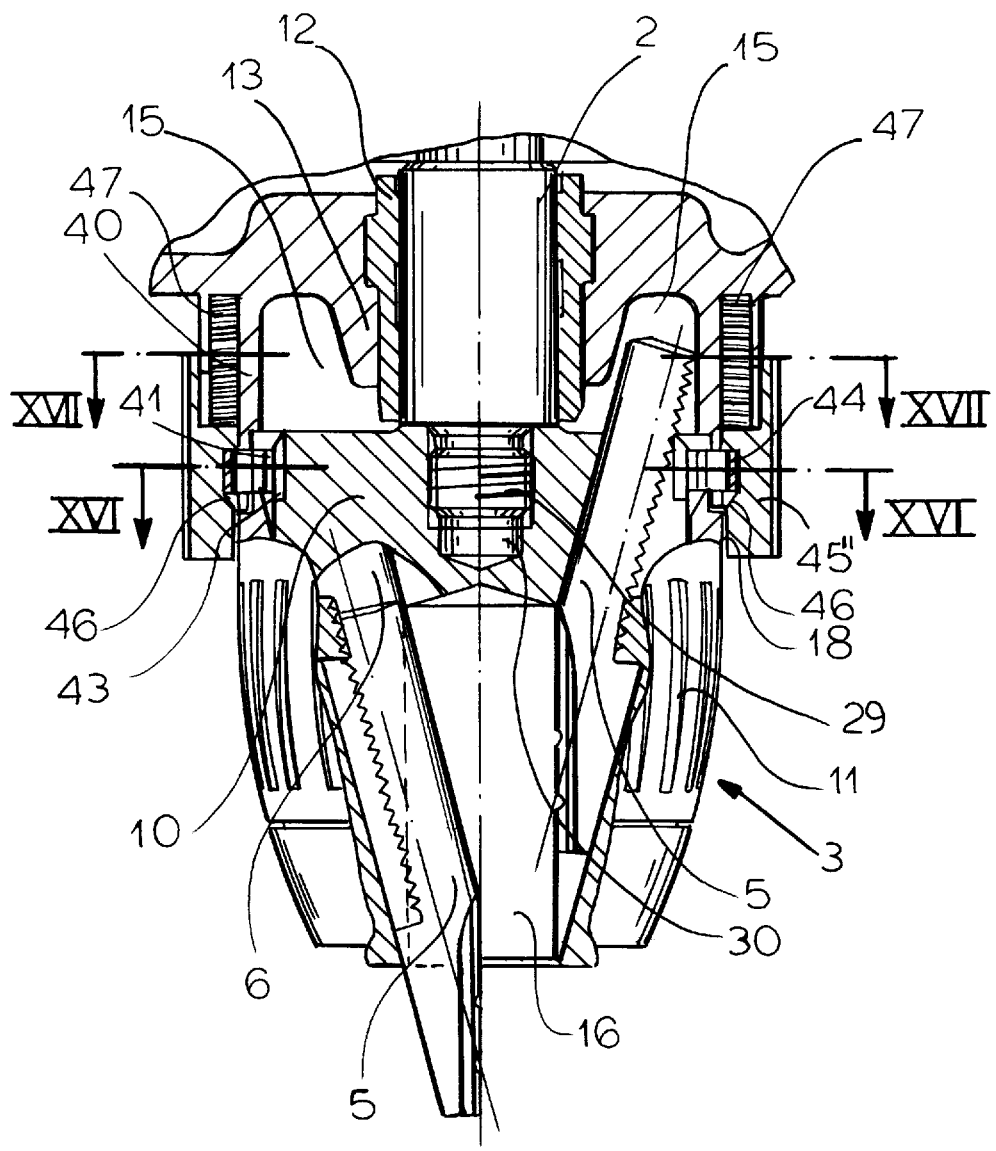
FIG. 15 is an axial section through yet another chuck.
Figure 16:
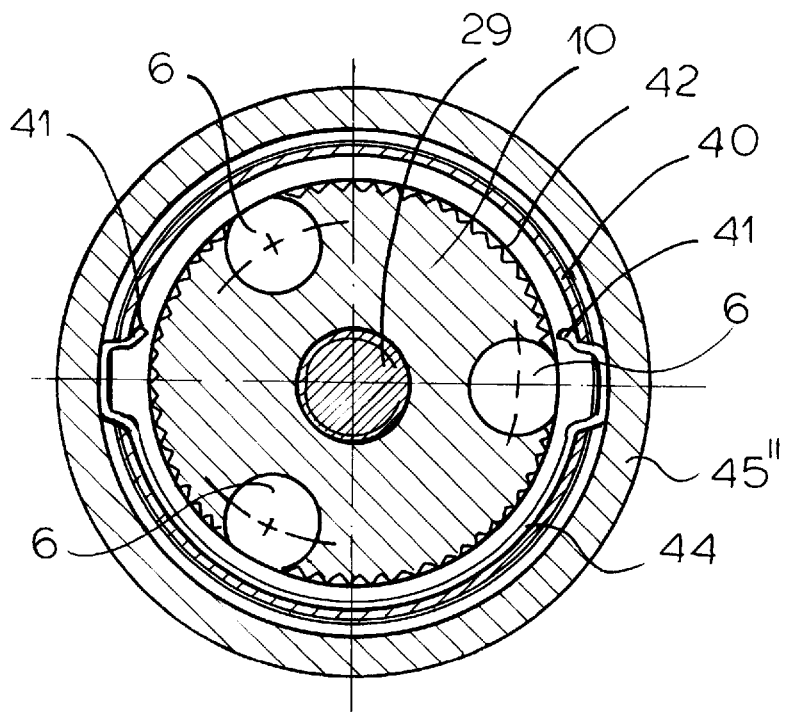
FIGS. 16 and 17 are cross sections taken along respective lines XVI—XVI and XVII—XVII of FIG. 15.
Figure 17:
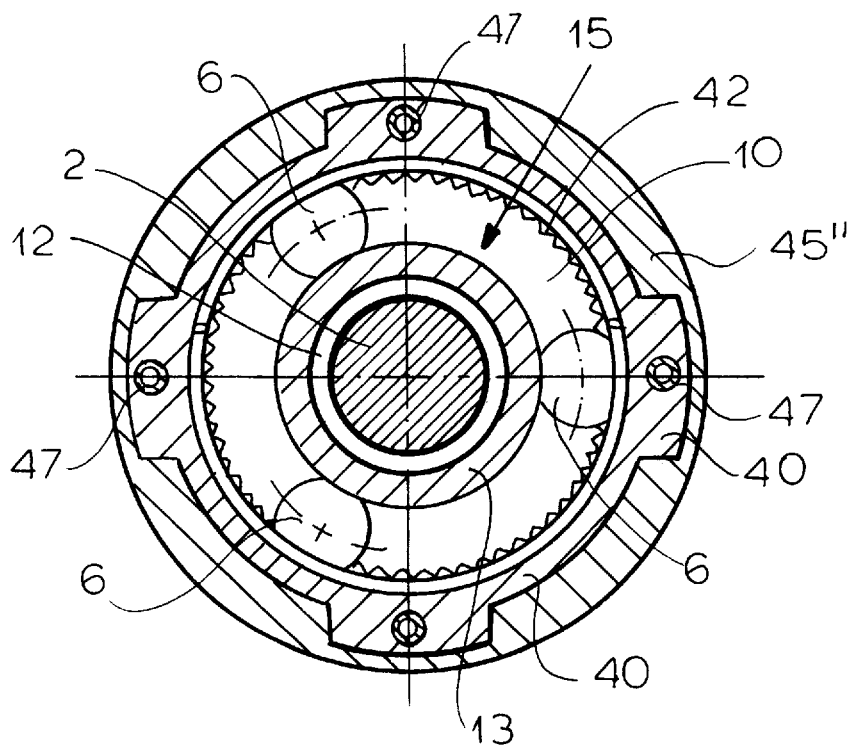
Figure 18:
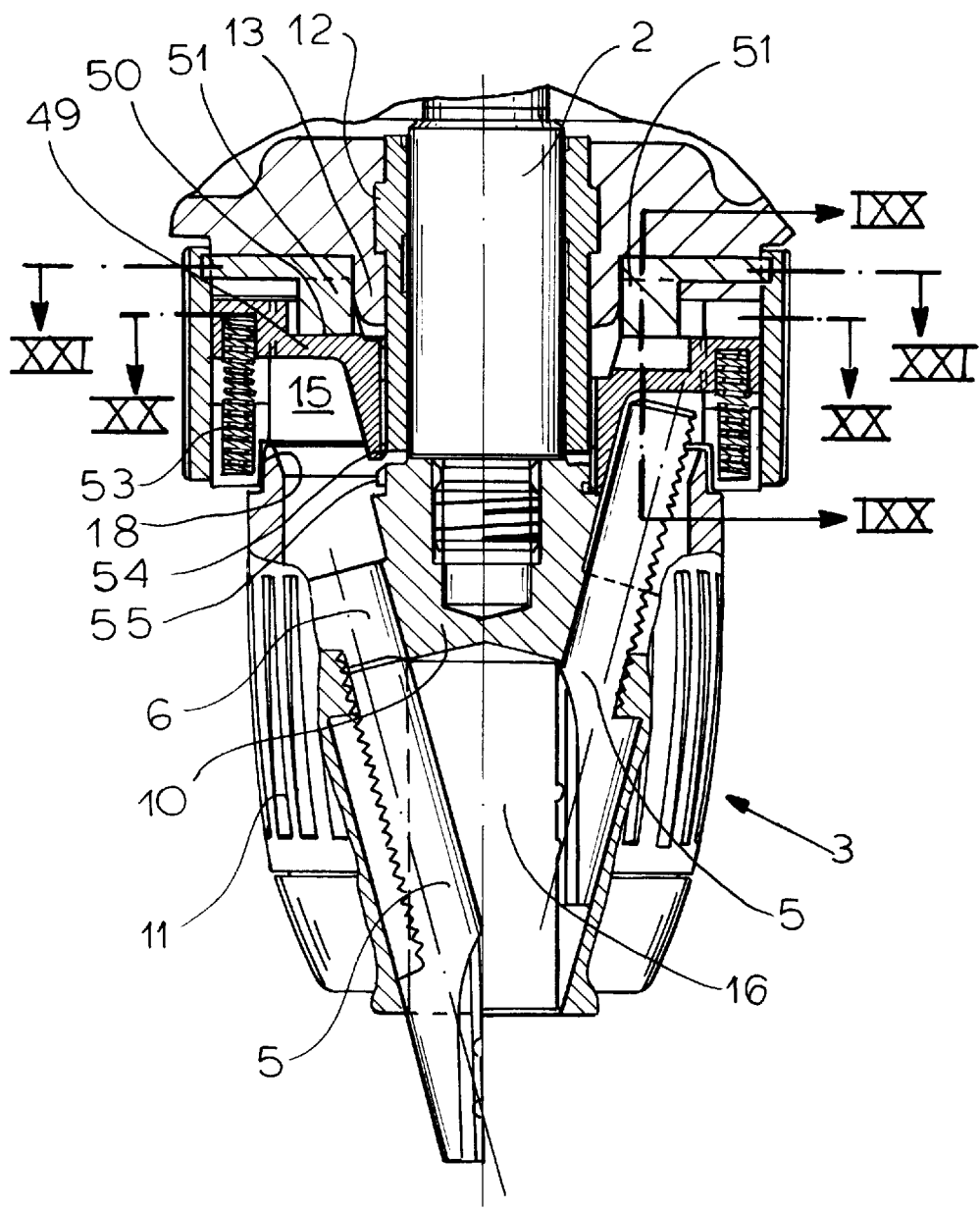
FIG. 18 is an axial section through yet another chuck.
Figure 19:
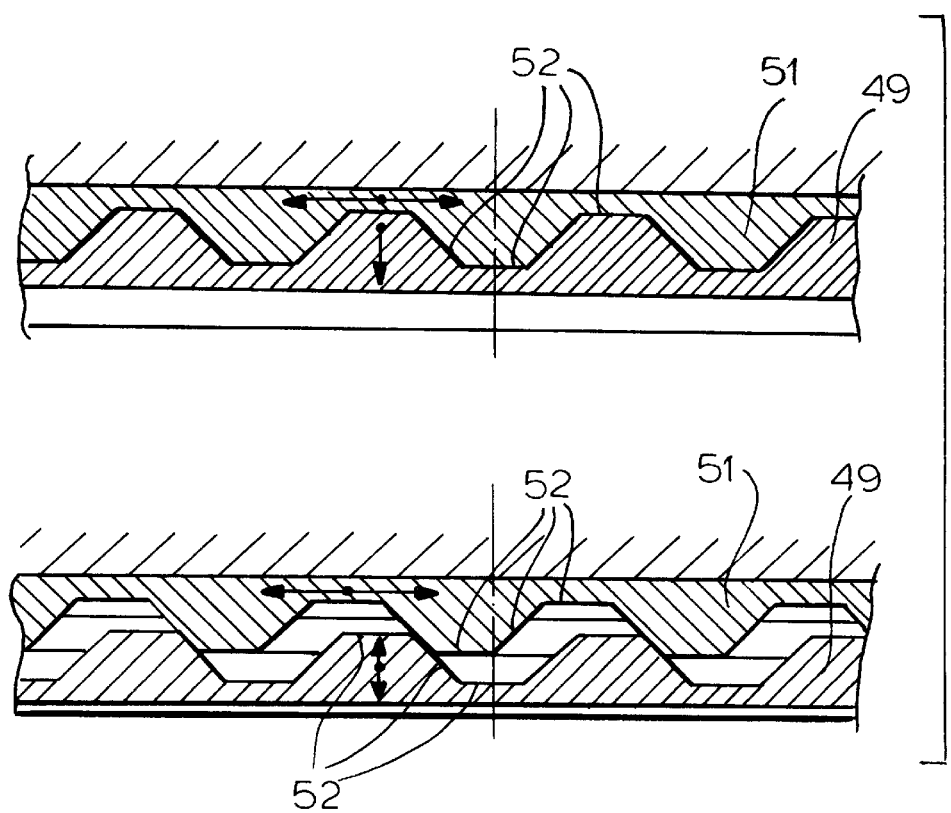
FIGS. 19 and 20 are cross sections taken along respective lines XIX—XIX and XX—XX of FIG. 18.
Figure 20:
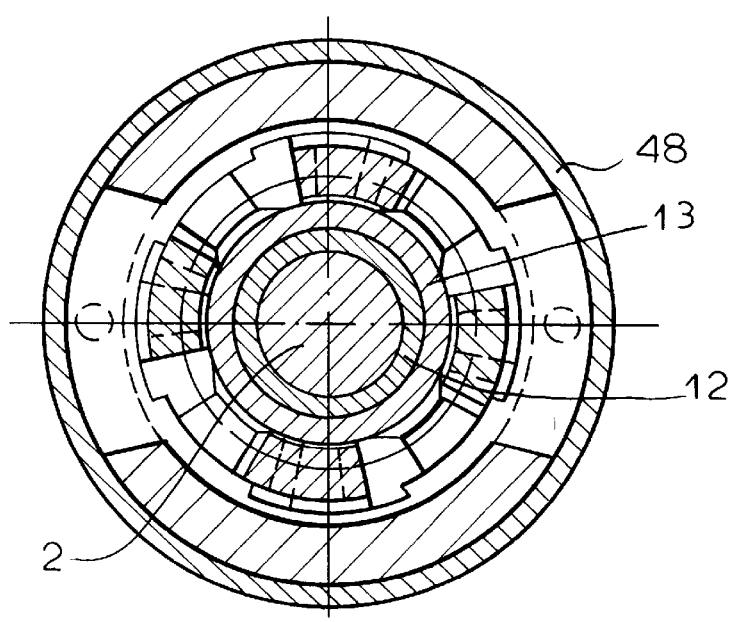

FIGS. 15 through 17 show another chuck where the spring 44 is actuated by an axially displaceable ring 45" that is urged forward by small compression springs 47 and that has an axially extending cam formation 46 that serves to push the spring 44 inward when the ring 45' is pulled back.

As seen in FIGS. 18 through 21 a locking ring 48 can rotate but not move axially on the chuck and carries an actuating ring 51 engaging via cam teeth 52 with an axially displaceable but nonrotatable ring 50. Springs 53 urge this ring 50 axially backward into the position shown on the left in FIG. 18 while rotation of the ring 49 will cam it axially forward and cause teeth 54 formed on its inner periphery to mesh with teeth 55 formed on the outside of the body 10 to rotationally arrest the chuck body 10 and allow torque to be applied to it to chuck or dechuck a tool.

Figure 22:
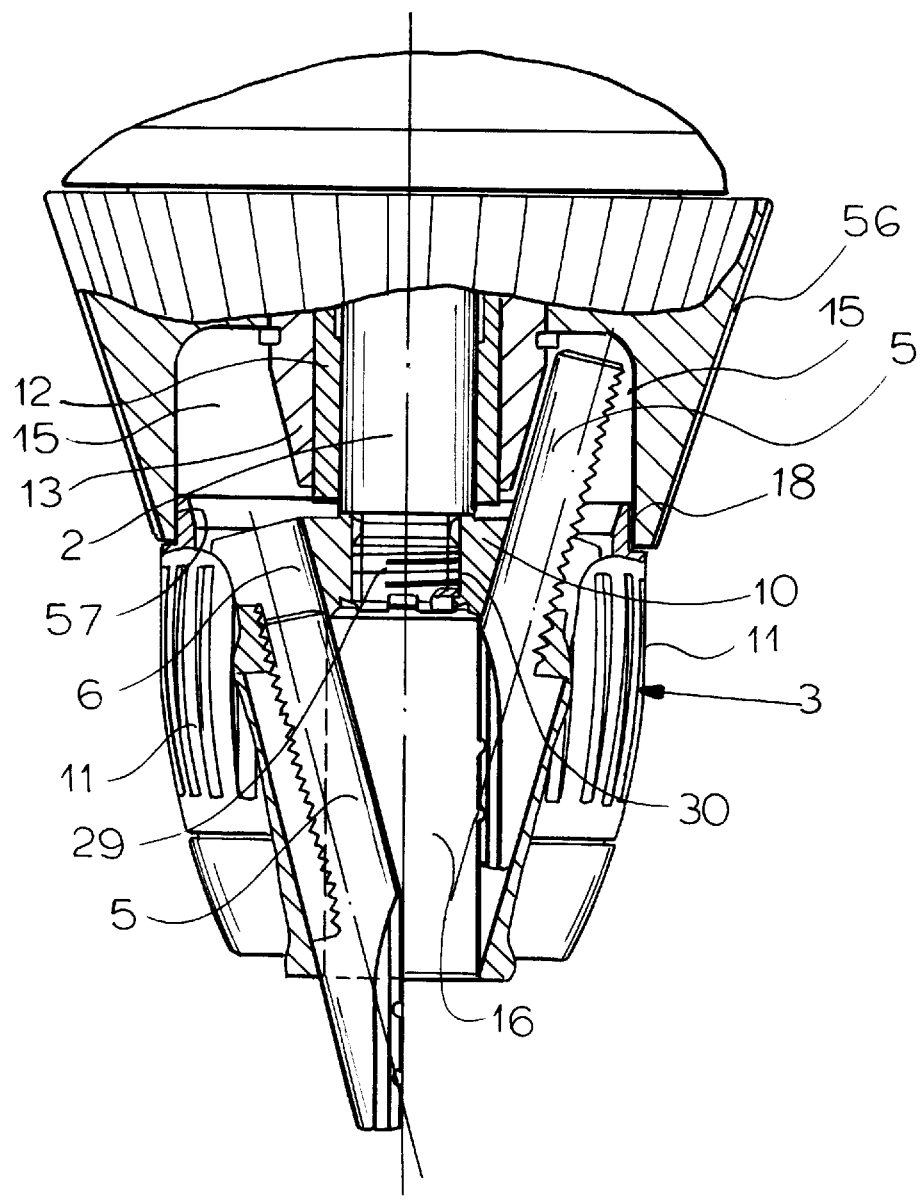
FIGS. 22 and 23 are axial sections through further chucks.

In FIG. 22 a ring 56 forming the chamber 15 can be rotated for controlling a clutch inside the housing 1 so that the torque can be controlled, for instance when using the device to drive screws.

Figure 23:
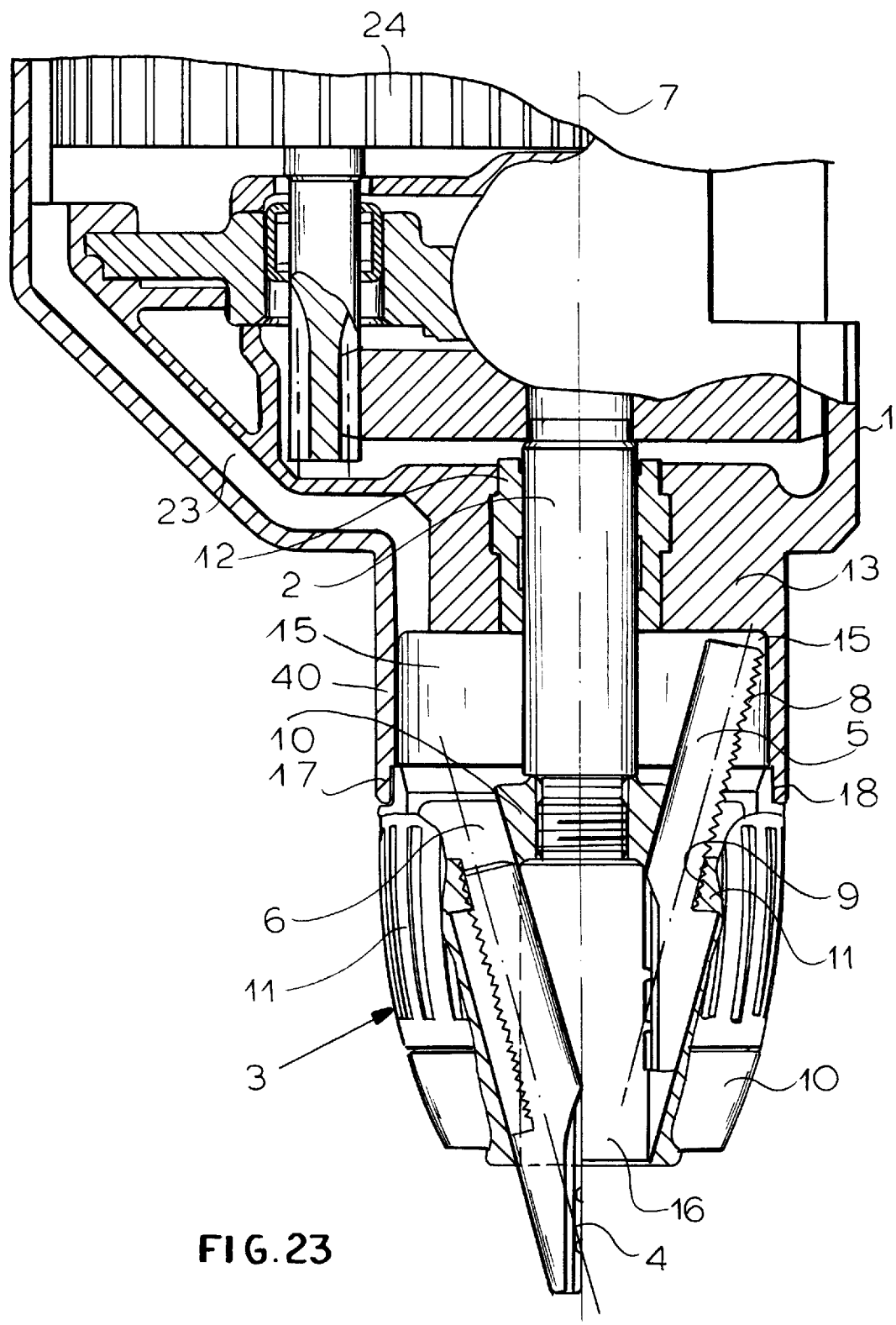

FIG. 23 shows another chuck assembly with a vent passage and a relatively long collar 40 engaging forward around the chuck body 10.

We claim:
1. A drill comprising:
a drill housing;
a drive spindle centered on and rotatable about an axis, projecting axially outward from the housing, and having an outer end;
a chuck element fixed on the spindle outer end and rotatable about the axis relative to the housing;
an annular formation axially fixed on the housing, centered on the axis, and extending axially forward to the chuck element, the formation defining with the chuck element an annular and axially forwardly open chamber, the chuck element being rotatable about the axis independently of the formation;
an adjustment ring element axially fixed but rotatable about the axis on the chuck element, one of the elements being formed with a plurality of axially forwardly open guide passages open axially rearward into the chamber and the other of the elements being formed with a screwthread centered on the axis, the elements both being rotatable about the axis relative to the formation; and
respective jaws displaceable in the passages between axially front and radially closely spaced positions and axially back and radially widely spaced positions and having teeth meshing with the screwthread, whereby rotation of the ring element in a forward direction on the chuck element displaces the jaws axially forward and radially inward and opposite rotation of the ring element in a reverse direction on the chuck element displaces the jaws axially backward and radially apart, the jaws projecting rearward from the one element into the chamber in the back positions.

2. The drill defined in claim 1 wherein the housing is provided with a bearing rotatably supporting the spindle and projecting from the housing, the chamber radially surrounding the bearing.

3. The drill defined in claim 1 wherein the chamber is radially outwardly closed by the formation.

4. The drill defined in claim 3 wherein the formation extends axially past the chamber.

5. The drill defined in claim 4 wherein the formation has an axially outer end axially overlapping one of the elements.

6. The drill defined in claim 4 wherein the formation axially overlaps the adjustment element.

7. The drill defined in claim 1 wherein the chuck body extends axially rearward past the chamber into the housing and is formed in the housing with a driven gear, the housing being provided with a drive gear meshing with the driven gear.

8. The drill defined in claim 1 wherein the housing is formed with a passage opening into the chamber, the drill further comprising
blower means in the housing connected to the passage for clearing chips from the chamber.

9. The drill defined in claim 1, further comprising means in the housing for axially hammering on the spindle.

10. The drill defined in claim 1 wherein the spindle and chuck element are unitary with each other.

11. The drill defined in claim 1 wherein the chuck element has a seat in which the spindle outer end is seated.

12. The drill defined in claim 11 wherein the outer end and seat have complementary noncylindrical shapes.

13. The drill defined in claim 11 wherein the outer end is provided with a snap ring axially coupling the spindle to the chuck element.

14. The drill defined in claim 11 wherein the outer end is formed with a groove open toward the chuck element and material of the chuck element engages in the groove.

15. The drill defined in claim 11, further comprising a key angularly fixing the chuck element on the spindle.

16. The drill defined in claim 11 wherein the outer end and seat are complimentarily threaded and the outer end is formed with an axially forwardly open groove while the chuck is deformed such that material of the chuck element engages in the groove.

17. The drill defined in claim 11 wherein the chuck element is formed between the jaws with an axially forwardly open tool-receiving recess and the spindle outer end engages in to the recess.

18. The drill defined in claim 11 wherein the spindle is limitedly axially movable relative to the chuck element.

19. The drill defined in claim 11 wherein the spindle outer end and chuck element have interengaging formations that angularly couple them together.

20. The drill defined in claim 1, further comprising:
   a radially displaceable member angularly fixed in the annular formation and displaceable between an inner position engaging and locking the chuck element angularly in the annular formation and an outer position out of engagement with the chuck element and permitting relative rotation between the chuck element and annular formation; and
   spring means engaging the radially displaceable member and urging same into the outer position.

21. The drill defined in claim 20 wherein the chuck element is formed with an annular array of teeth engageable by the member.

22. The drill defined in claim 20 wherein the guide passages have rear ends into which the member is engageable.

23. The drill defined in claim 20 wherein the spring means is an angularly extending leaf spring having an end constituting the member, the leaf spring being provided with an actuating part engaged through the annular formation.

24. The drill defined in claim 23 wherein the spring has two such ends each constituting such a member and each provided with a respective such actuating part.

25. The drill defined in claim 23 wherein the actuating part is a ring displaceable on the annular formation and having a cam engaging the spring.

26. The drill defined in claim 25 wherein the actuating ring is angularly but not axially displaceable on the formation.

27. The drill defined in claim 25 wherein the actuating ring is axially but not angularly displaceable on the formation.

28. The drill defined in claim 1, further comprising
   a locking ring rotationally fixed on the housing and axially displaceable between one end position axially engaging and angularly arresting the chuck element and an opposite end position out of engagement with the chuck element.

29. The drill defined in claim 28 wherein the locking ring and chuck element have axially interengageable teeth.

30. The drill defined in claim 28 wherein the locking ring includes
   an outer ring part limitedly rotatable but axially fixed on the housing,
   an inner ring part axially displaceable but nonrotatable on the housing, and
   cam means between the ring parts for axially displacing the inner part on rotation of the outer part relative to the housing.

31. A drill comprising:
   a drill housing unitarily formed with an annular formation centered on an axis, extending axially outward, and defining an outer wall of an annular chamber;
   a drive spindle centered on and rotatable about the axis, projecting axially outward from the housing, and having an outer end;
   a chuck element fixed on the spindle outer end;
   an adjustment ring element axially fixed but rotatable about the axis on the chuck element, one of the elements being formed with a plurality of axially forwardly open guide passages open axially rearward into the chamber and the other of the elements being formed with a screwthread centered on the axis, the elements both being rotatable about the axis relative to the formation; and
   respective jaws displaceable in the passages between axially front and radially closely spaced positions and axially back and radially widely spaced positions and having teeth meshing with the screwthread, whereby rotation of the ring element in a forward direction on the chuck element displaces the jaws axially forward and radially inward and opposite rotation of the ring element in a reverse direction on the chuck element displaces the jaws axially backward and radially apart, the jaws projecting rearward from the one element into the chamber in the back positions.

* * * * *